Patented July 20, 1954

2,684,348

UNITED STATES PATENT OFFICE 2,684,348

COMPOSITIONS COMPRISING AN ACRYLONITRILE POLYMER, AN ALKALI METAL OR ALKALINE EARTH METAL THIOCYANATE, AND AN ALIPHATIC ALCOHOL

Melvin A. Dietrich, Claymont, and Albert F. Smith, Wilmington, Del., assignors to E. I. du Pont de Nemours & Company, Wilmington, Del., a corporation of Delaware No Drawing. Application February 7, 1952, Serial No. 270,522

14 Claims. (Cl. 260—30.8)

This invention relates to thermoplastic acrylonitrile polymer compositions.

Acrylonitrile polymers of predominant acrylonitrile content are generally considered non-thermoplastic and are not subject to fabrication of shaped articles by the application of heat and pressure. Organic solvents generally employed for shaping such intractable polymers are disadvantageous, inter alia, in that they are expensive, frequently have toxic properties, and entail difficulties in recovery. Salt solutions have been suggested as suitable solvents for such relatively inert polymers as polyacrylonitriles, as shown by U. S. Pat. 2,140,921, but the acrylonitrile content of the solution is rather low, i. e., 6% or less as indicated in the examples of said patent. Thus, it has not been possible to obtain solutions that have high polymer content or contain large amounts of high molecular weight material since either the viscosity is too high—gelation taking place—or the actual solubility is too low. The salt solutions of polymers heretofore available have been employed to give objects such as films or fibers of relatively thin cross-sectional area by removal of salt and water in a precipitation bath. Such systems, even when improved by the addition of small amounts of an alcohol, as described in McClellan Ser. No. 231,248, filed June 12, 1951, cannot be employed to obtain films, filaments, or molded objects through standard thermoplastic fabrication techniques. In addition such systems require the use of relatively large quantities of solvents.

This invention has as an object a method of preparing films, filaments, and molded objects from polymeric acrylonitrile. A further object is the provision of compositions suitable for said method. Another object is a method for the preparation of generally solid (non-fluid) polymeric acrylonitrile compositions useful for fabrication into films or filaments under pressure at elevated temperature. Other objects will appear hereinafter.

These objects are accomplished by the present invention of solid (non-fluid) compositions containing 33–75% of an acrylonitrile polymer in which acrylonitrile is the major component, 18–46% of an alkali or alkaline earth thiocyanate, and 5–33% of an aliphatic alcohol having at least one alcohol group per five carbons, liquid at room temperature and soluble in water to an extent of at least 2% at 20° C., in which composition the ratio of salt to polymer is from 3:10 to 1:1 and salt to alcohol is from 1:1 to 5:1. Another phase of the present invention is the shaping of these solid thermoplastic compositions under pressure at temperatures above about 25° C.

The following examples in which parts are by weight are illustrative of the invention. When films were obtained by use of a Carver press, the pressure reported is the gauge pressure which corresponds to a film pressure of the order of 400–1000 lbs./sq. in.

Example I

A. Ten parts polyacrylonitrile (intrinsic viscosity, 1.95) (33%) and ten parts dry sodium thiocyanate (33%) were thoroughly mixed in a mortar. To this mixture, ten parts ethylene glycol (33%) was then added slowly with constant mixing. The mixture initially was powdery but, on standing, gradually changed into a plastic gum. This gum could be molded by hand into any shape desired. It could be stretched by hand, resembling rubber somewhat in this characteristic.

The gum was extruded in a press spinner at 124° C. through a one-hole (32 mil) spinneret into three inches of water at 15° C. and wound up manually on a bobbin. While still on the bobbin it was washed in running water until free of salt and glycol. The monofil was drawn, after washing and while still wet, through air or through water to produce filaments with the following properties (after drying).

| No. | Drawing Medium | Draw Ratio | Denier | Tenacity/Elongation, g. p. d./Percent | Modulus, g. p. d./100% |
|---|---|---|---|---|---|
| 1 | Air at 25° C | 3X | 759.2 | 1.2/45 | 37.3 |
| 2 | Water at 65° C | 5.5X | 608.2 | 1.2/27 | 33.8 |
| 3 | Water at 90° C | 8.8X | 323.9 | 2.5/12 | 60.0 |
| 4 | do | 12.6X | 276.9 | 2.4/9 | 72.0 |
| 5 | do | 16.0X | 271.1 | 2.7/17 | 49.3 |
| 6 | do | 22.0X | 220.7 | 3.2/8 | 81.0 |

B. The plastic gum in A was pressed at 50° C. and at 70° C. between sheets of cellophane on a press at 15,000 lbs. to produce clear films of 9 to 10 ml. thickness. After washing and drying the films were brittle. Calendering dicyclohexylammonium oleate into the gel films, followed by drying, produced tough, clear, and pliable films.

C. The composition described in A was pressed into a film on a press at 100° C. and 15,000 lbs. pressure. The film was washed, drawn 100% in 90° C. water, while in gel form and then dried. The films were tough and pliable. Another film pressed from this composition was stretched 3X in the width direction and 3.8X in the length direction in 90° C. water immediately after pressing. The stretched film was washed in water in taut condition and dried in the relaxed condition. It was tough, clear, and pliable.

Example II

A series of compositions was prepared in which the ratio of polymer to salt to glycol was varied to give compositions which could be shaped into articles by application of pressure and heat. The compositions were pressed into films in a press at 15,000–17,000 lbs. using temperatures ranging from 140° C. to 220° C. The make-up of these compositions, expressed in terms of parts by weight (and per cent) and the characteristics of the films obtained from them are given in the following table. The polymer used had an intrinsic viscosity of 1.87.

| Composition | | | Appearance of mixture | Characteristics of Film Obtained in Press |
|---|---|---|---|---|
| Polyacrylonitrile | NaSCN | Ethylene Glycol | | |
| 1 (33.3%) | 1 (33.3%) | 1 (33.3%) | Plastic gum | Tough and pliable. |
| 2 (50%) | 1 (25%) | 1 (25%) | Powder. | Do. |
| 2 (40%) | 2 (40%) | 1 (20%) | do | Do. |
| 4 (57%) | 2 (29%) | 1 (14%) | do | Do. |
| 4 (44.5%) | 4 (44.5)% | 1 (11%) | do | Do. |
| 10 (72%) | 3 (21%) | 1 (7%) | do | Do. |
| 10 (62.5%) | 5 (31.5%) | 1 (6%) | do | Do. |

These results show that workable compositions are obtained in the polymer-salt ratio between about 1/1 and 10/3, and the salt-hydroxy compound ratio lies between 1/1 and 5/1. Compositions falling within these ratios range from stiff gums to powdery solids.

In contrast to this, a composition containing 20 parts (77%) polymer, 5 parts (19%) salt, and one part (4%) glycol gave a brittle film. This composition exceeds the 75% polymer maximum of this invention.

Example III

Ten parts of a copolymer of acrylonitrile and styrene, containing 14.5% styrene and having an intrinsic viscosity of 1.83, were mixed with 10 parts sodium thiocyanate and 10 parts ethylene glycol to form a plastic gum. Films pressed from this composition in a press at 70° C. were tough, clear, and pliable while wet.

Example IV

Ten parts of a copolymer of acrylonitrile and styrene containing 7.3% by weight of styrene and having an intrinsic viscosity of 1.98 were mixed with 10 parts of sodium thiocyanate and 10 parts ethylene glycol. A stiff gum was formed from which films were pressed which were clear and flexible in the gel state.

Example V

An acrylonitrile/vinyl acetate copolymer containing 12% vinyl acetate (intrinsic viscosity of 2.4) was used as in Example IV. The film obtained was bright and clear. The composition from which the film was obtained was a plastic gum.

Example VI

An acrylonitrile/methyl acrylate copolymer containing approximately 10% methyl acrylate (intrinsic viscosity of 2.3) was used as in Example IV. The composition formed was a soft gum from which a clear, bright film was pressed at 140° C. and 18,000 lbs. pressure.

Example VII

An acrylonitrile/isobutylene copolymer containing 17% isobutylene was treated as in Example IV. The composition formed was a soft gum. A film pressed at 150° C. and 17,000 lbs. was clear and bright.

Example VIII

An acrylonitrile/diketene copolymer, containing 5% diketene, was treated as in Example IV. A bright and clear film was obtained by pressing at 170° C. and 15,000 lbs. The composition from which the film was obtained was a gum.

Example IX

When an acrylonitrile/vinyl pyridine copolymer (5% vinyl pyridine) was used as in Example IV, a gum was obtained which, pressed at 190° C. and 16,000 lbs., formed a brilliantly clear film.

Example X

Repetition of the general procedure of Example IV, except that the following polymers were employed, gave substantially the same products: acrylonitrile/hydroxyethyl methacrylate (90/10), acrylonitrile/hydroxyethyl methacrylate (85/15), and acrylonitrile/allyloxyethanol (92/8).

Example XI

Ten parts by weight of polyacrylonitrile (intrinsic viscosity of 1.87), 10 parts of sodium thiocyanate, and 10 parts by weight of n-amyl alcohol were mixed to form a dry dough. A film pressed at 158° C. and 15,000 lbs. was tough, clear, and pliable.

Example XII

Isopropyl alcohol was used in place of n-amyl alcohol in Example XI. The film obtained from the composition on pressing was clear and coherent but tended to be brittle. The film was pressed at 158° C. and 15,000 lbs.

Example XIII

Glycerin was used in place of ethylene glycol to give a clear, tough, pliable film similar to that of Example XI. The film was pressed at 180° C. and 15,000 lbs.

Example XIV

When the general procedure of Example XI was repeated except that triethanolamine was employed in place of ethylene glycol, a product was obtained which gave clear and coherent films on pressing.

Example XV

Ten parts by weight of polyacrylonitrile, 10 parts of potassium thiocyanate, and 10 parts of ethylene glycol were mixed thoroughly. The composition was powdery. A film pressed at 140° C. and 15,000 lbs. was clear and could be drawn after washing in water at 20° C.

Example XVI

One hundred parts of polyacrylonitrile (intrinsic viscosity of 1.87), 20 parts by weight of a fatty alcohol sulfate surface active agent; and 100 parts of sodium thiocyanate, were mixed thoroughly in a Banbury mixer, following which 80 parts by weight of ethylene glycol were added slowly with constant mixing. The rubber-like dough which was obtained was then worked for a few minutes in a Thropp mill and then run on a three-roll calender machine at 38° C. The film which was formed was tough and clear.

*Example XVII*

Plastic doughs containing equal parts by weight of polyacrylonitrile, sodium thiocyanate, and ethylene glycol were formed into multi-filament yarns by using a screw extruder and a ten-hole spinneret at 180° C. Clear films were formed by using a screw extruder and a three-inch die at 140° C.

The present invention is generic to the employment in the compositions of this invention of acrylonitrile polymers in which acrylonitrile is the major component. Any such polymer can be used including copolymers of acrylonitrile with methacrylonitrile, vinyl chloride, vinyl acetate, styrene; amino nitrogen containing monomers, e. g., vinylpyridines; quaternary ammonium monomers, e. g., vinyloxyethyltrimethyl-ammonium chloride. The amount of polymerizable vinylidene monomer other than the acrylonitrile present in the copolymers is less than 50%. Generally, the amount of acrylonitrile is at least 85%. Acrylonitrile homopolymer is preferred.

The polymer is preferably employed in a finely divided form in the manufacture of the solid coherent compositions of this invention. Mixture with the salt and alcohol is effected faster when the particle size of the polymer is small, e. g., such as that obtained by the polymerization of acrylonitrile in aqueous systems.

The molecular weight of the polymer is not critical. In general, the polymer should be fiber forming, since utility is usually greatest for such polymers. Polymers having a medium molecular weight, e. g., 5,000 to 100,000, offer a good balance between ease of fabrication and physical properties of the resulting shaped and oriented objects.

The amount of acrylonitrile polymer present in the polymer/salt/alcohol mixture is at least 33% and not more than 75%. In general, preferred products have from 40 to 65% polymer.

The present invention is generic to thiocyanates of lithium, sodium, potassium, magnesium, calcium and zinc, i. e., of elements of atomic number of 3 to 19 of group I and of 12 to 30 of group II. In view of their availability and ease in forming the plastic solid compositions, thiocyanates of the alkali metals and alkaline earth metals are preferred.

The amount of thiocyanate employed in the production of the composition of this invention is 18 to 46% by weight of the polymer/salt/alcohol. Most useful are amounts of from 25 to 40%.

The present invention is generic to the employment in the compositions of this invention of an aliphatic alcohol which has at least one oxy, i. e., alcohol, group per five carbons, is liquid at 25° C., is soluble to an extent of at least 2% in water at 20° C., and has a carbon to oxy oxygen ratio of between 1 to 1 and 5 to 1. Although unsaturated alcohols, e. g., allyl and propargyl alcohols can be employed, the preferred compounds are saturated, i. e., free from carbon to carbon unsaturation, are hydrocarbon except for alcoholic hydroxyl, and contain not more than six carbons. Thus, there can be employed in the compositions of this invention monohydric alcohols, e. g., methyl, ethyl, propyl, butyl, furfuryl, and amyl alcohols; glycols, e. g., ethylene glycol, propylene glycol, and hexamethylene glycol; higher polyhydric alcohols, e. g., glycerol and sorbitol; hydroxy ethers, e. g., diethylene glycol and the monomethyl and monoethyl ethers of ethylene glycol and diethylene glycol. Superior results are obtained with alcohols that boil above the fabrication temperature and particularly the glycols of 2 to 3 carbons. The alcohol oxy compound is present in the compositions of this invention in amounts of from 5 to 33% of the weight of the total of polymer, salt, and alcohol. Water is generally not beneficial since films obtained from compositions containing water are porous. The addition of surface active agents permits calendering at lower temperatures to provide coherent films.

The plastic materials of this invention are generally made by mixing in conventional equipment, e. g., mixing in a mortar, milling, Waring Blendor, Thropp mill, or Banbury mixer.

The products of this invention can be modified through the addition of color forming materials, plasticizers, surface active agents, etc. Examples of such materials are carbon black, zinc oxide, pigments, zinc stearate, and sodium oleate.

In the fabrication of products from the plastic materials of this invention, a pressure of at least 25 lbs./sq. in. and preferably 50–1000 lbs./sq. in. at temperatures of at least 50° C. and preferably 115–220° C. are employed. With high temperatures, lower pressures can be used.

The plastic materials of this invention are useful for the preparation of molded objects such as films and fibers. They are especially advantageous in that excess water removes the salt rapidly from such molded objects. For example, tests on 6 mil films show that all of the salt and glycol is removed in 15 to 30 seconds by hot water; whereas other agents such as tetramethylene sulfone or dimethylformamide require as high as 240 seconds contact with hot water.

The ingredients of the compositions of this invention are readily available, cheap, and easy to recover for reuse.

A further advantage of the compositions of this invention is that high concentrations of polymer can be used in fabrication of objects such as films and fibers. Solutions containing such high concentrations of polymer are not susceptible to use in the preparation of such objects. The present invention is of particular advantage in allowing lower spinning temperatures and pressures, in reducing the tendency of the acrylonitrile polymer to discolor and decompose, in affording films of superior clarity and in allowing the obtaining of films by calendering.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A solid, essentially non-aqueous composition containing 33–75% of an acrylonitrile polymer of major acrylonitrile content, 18–46% of a metal thiocyanate of the class consisting of alkali metal thiocyanates and alkaline earth metal thiocyanates, and 5–33% of an aliphatic alcohol which has at least one alcoholic hydroxyl per five carbons, is liquid at 25° C., and is soluble in water to the extent of at least 2% at 20° C., in which composition the weight ratio of salt to polymer is from 3:10 to 1:1 and the weight ratio of salt to alcohol is from 1:1 to 5:1.

2. A solid, essentially non-aqueous composition containing 33–75% of an acrylonitrile polymer of major acrylonitrile content, 18–46% of a thiocyanate of a metal from those of atomic number of 3 to 19 in group I and of 12 to 30 in group II and 5–33% of an aliphatic alcohol which has at least one alcoholic hydroxyl per five carbons, is liquid at 25° C., and is soluble in water to the extent of at least 2% at 20° C., in which composition the weight ratio of salt to polymer is from 3:10 to 1:1 and the weight ratio of salt to alcohol is from 1:1 to 5:1.

3. A solid, essentially non-aqueous composition containing 33–75% of an acrylonitrile polymer of major acrylonitrile content, 18–46% of an alkali metal thiocyanate, and 5–33% of an aliphatic alcohol which has at least one alcoholic hydroxyl per five carbons, is liquid at 25° C., and is soluble in water to the extent of at least 2% at 20° C., in which composition the weight ratio of salt to polymer is from 3:10 to 1:1 and the weight ratio of salt to alcohol is from 1:1 to 5:1.

4. A solid, essentially non-aqueous composition containing 33–75% of an acrylonitrile polymer of major acrylonitrile content, 18–46% of a metal thiocyanate of the class consisting of alkali metal thiocyanates and alkaline earth metal thiocyanates, and 5–33% of a glycol of 2–3 carbons in which composition the weight ratio of salt to polymer is from 3:10 to 1:1 and the weight ratio of salt to glycol is from 1:1 to 5:1.

5. A solid, essentially non-aqueous composition containing 40–65% of an acrylonitrile polymer of major acrylonitrile content, 25–40% of a metal thiocyanate of the class consisting of alkali metal thiocyanates and alkaline earth metal thiocyanates, and 5–33% of a glycol of 2–3 carbons in which composition the weight ratio of salt to polymer is from 3:1 to 1:1 and the weight ratio of salt to glycol is from 1:1 to 5:1.

6. A solid, essentially non-aqueous composition containing 40–65% of an acrylonitrile polymer of major acrylonitrile content, 25–40% of a sodium thiocyanate, and 5–33% of a glycol of 2–3 carbons in which composition the weight ratio of salt to polymer is from 3:10 to 1:1 and the weight ratio of salt to glycol is from 1:1 to 5:1.

7. A solid, essentially non-aqueous composition containing 40–65% of an acrylonitrile polymer of major acrylonitrile content, 25–40% of a metal thiocyanate of the class consisting of alkali metal thiocyanates and alkaline earth metal thiocyanates, and 5–33% of a saturated aliphatic alcohol, hydrocarbon except for alcoholic hydroxyl, of no more than six carbons, of at least one hydroxyl per five carbons, liquid at 25° C., and soluble to the extent of at least 2% in water at 20° C., in which composition the weight ratio of salt to polymer is from 3:10 to 1:1 and the weight ratio of salt to alcohol is from 1:1 to 5:1.

8. A solid, essentially non-aqueous composition containing 40–65% of an acrylonitrile polymer of major acrylonitrile content, 25–40% of an alkali metal thiocyanate, and 5–33% of a saturated aliphatic alcohol, hydrocarbon except for alcoholic hydroxyl, of no more than six carbons, of at least one hydroxyl per five carbons, liquid at 25° C., and soluble to the extent of at least 2% in water at 20° C., in which composition the weight ratio of salt to polymer is from 3:10 to 1:1 and the weight ratio of salt to alcohol is from 1:1 to 5:1.

9. A solid, essentially non-aqueous composition containing 33–75% of an acrylonitrile homopolymer, 18–46% of a metal thiocyanate of the class consisting of alkali metal thiocyanates and alkaline earth metal thiocyanates, and 5–33% of an aliphatic alcohol which has at least one alcoholic hydroxyl per five carbons, is liquid at 25° C., and is soluble in water to the extent of at least 2% at 20° C., in which composition the weight ratio of salt to polymer is from 3:10 to 1:1 and the weight ratio of salt to alcohol is from 1:1 to 5:1.

10. A solid, essentially non-aqueous composition containing 33–75% of an acrylonitrile homopolymer, 18–46% of an alkali metal thiocyanate, and 5–33% of an aliphatic alcohol which has at least one alcoholic hydroxyl per five carbons, is liquid at 25° C., and is soluble in water to the extent of at least 2% at 20° C., in which composition the weight ratio of salt to polymer is from 3:10 to 1:1 and the weight ratio of salt to alcohol is from 1:1 to 5:1.

11. A solid, essentially non-aqueous composition containing 33–75% of an acrylonitrile homopolymer, 18–46% of an alkali metal thiocyanate, and 5–33% of a saturated aliphatic alcohol, hydrocarbon except for alcoholic hydroxyl, of no more than six carbons, of at least one hydroxyl per five carbons, liquid at 25° C. and soluble to the extent of at least 2% in water at 20° C., in which composition the weight ratio of salt to polymer is from 3:10 to 1:1 and the weight ratio of salt to alcohol is from 1:1 to 5:1.

12. A solid, essentially non-aqueous composition containing 33–75% of an acrylonitrile homopolymer, 18–46% of an alkali metal thiocyanate, and 5–33% of a glycol of 2–3 carbons, in which composition the ratio of salt to polymer is from 3:10 to 1:1 and the weight ratio of salt to glycol is from 1:1 to 5:1.

13. A solid, essentially non-aqueous composition containing 33–75% of an acrylonitrile polymer of major acrylonitrile content, any comonomer being monoethylenically unsaturated and present in the polymer in minor amount, 18–46% of a metal thiocyanate of the class consisting of alkali metal thiocyanates and alkaline earth metal thiocyanates, and 5–33% of a saturated aliphatic alcohol, hydrocarbon except for alcoholic hydroxyl, of no more than six carbons, of at least one hydroxyl per five carbons, liquid at 25° C., and soluble to the extent of at least 2% in water at 20° C., in which composition the weight ratio of salt to polymer is from 3:10 to 1:1 and the weight ratio of salt to alcohol is from 1:1 to 5:1.

14. A solid, essentially non-aqueous composition containing 33–75% of an acrylonitrile polymer of major acrylonitrile content, any comonomer being monoethylenically unsaturated and present in the polymer in minor amount, 18–46% of an alkali metal thiocyanate, and 5–33% of a saturated aliphatic alcohol, hydrocarbon except for alcoholic hydroxyl, of no more than six carbons, of at least one hydroxyl per five carbons, liquid at 25° C., and soluble to the extent of at least 2% in water at 20° C., in which composition the weight ratio of salt to polymer is from 3:10 to 1:1 and the weight ratio of salt to alcohol is from 1:1 to 5:1.

References Cited in the file of this patent

UNITED STATES PATENTS

| Number | Name | Date |
|---|---|---|
| 2,533,224 | Cresswell | Dec. 12, 1950 |
| 2,558,730 | Cresswell | July 3, 1951 |